(12) United States Patent
Yuan et al.

(10) Patent No.: US 12,433,398 B2
(45) Date of Patent: Oct. 7, 2025

(54) LIFT STRUCTURE WITH ADJUSTMENT ASSISTANCE OPTIMIZED BASED ON ERGONOMICS AND INSTALLATION METHOD THEREOF

(71) Applicant: QIDONG VISION MOUNTS MANUFACTURING CO., LTD., Jiangsu (CN)

(72) Inventors: Luo Yuan, Jiangsu (CN); Chaojie Huang, Jiangsu (CN); Hairong Lu, Jiangsu (CN)

(73) Assignee: QIDONG VISION MOUNTS MANUFACTURING CO., LTD., Jiangsu (CN)

( * ) Notice: Subject to any disclaimer, the term of this patent is extended or adjusted under 35 U.S.C. 154(b) by 517 days.

(21) Appl. No.: 17/985,808

(22) Filed: Nov. 11, 2022

(65) Prior Publication Data
US 2023/0072671 A1  Mar. 9, 2023

Related U.S. Application Data

(63) Continuation of application No. PCT/CN2021/113306, filed on Aug. 18, 2021.

(51) Int. Cl.
*A47B 21/02* (2006.01)
*B66F 3/24* (2006.01)
*B66F 3/36* (2006.01)

(52) U.S. Cl.
CPC .............. *A47B 21/02* (2013.01); *B66F 3/245* (2013.01); *B66F 3/36* (2013.01)

(58) Field of Classification Search
CPC . A47B 21/02; B66F 3/245; B66F 3/36; B66F 7/065; B66F 7/085
See application file for complete search history.

(56) References Cited

U.S. PATENT DOCUMENTS 4,558,648 A * 12/1985 Franklin ................. B66F 7/065
                                                                   248/588
4,712,653 A    12/1987 Franklin et al.
(Continued)

FOREIGN PATENT DOCUMENTS

CN         1736845 A      2/2006
CN       210611418 U      5/2020
(Continued)

*Primary Examiner* — Seahee Hong
(74) *Attorney, Agent, or Firm* — SZDC Law PC

(57) ABSTRACT

A lift structure with adjustment assistance optimized based on ergonomics includes a top, a base, an X-shaped cross arm and a gas spring, wherein the X-shaped cross arm includes a first directional arm and a second directional arm; wherein one end of the gas spring rotates around a second rotating shaft fixed relative to the first directional arm, and the other end rotates around a third rotating shaft fixed relative to the second directional arm, and the first, second and third rotating axes being parallel with each other; and wherein at the reference height, in a plane where an axis of the gas spring is located and is perpendicular to the respective rotating axes, the axis of the gas spring is tangent to a circumference centered on the first rotating shaft and having a set radius, with a tangent point being located on the second rotating shaft.

14 Claims, 11 Drawing Sheets

(56) References Cited

U.S. PATENT DOCUMENTS

| | | | | |
|---|---|---|---|---|
| 4,764,075 A * | 8/1988 | Cox | ................... | B65G 1/07 |
| | | | | 211/59.3 |
| 5,632,209 A * | 5/1997 | Sakakibara | ........... | B66F 7/0608 |
| | | | | 248/588 |
| 5,695,173 A * | 12/1997 | Ochoa | ................... | B66F 7/065 |
| | | | | 254/9 C |
| 5,833,198 A * | 11/1998 | Graetz | ................... | A47B 9/16 |
| | | | | 248/370 |
| 8,015,638 B2 * | 9/2011 | Shimada | ................ | A47C 19/045 |
| | | | | 108/147 |
| 8,733,508 B2 * | 5/2014 | Bacon | ................... | B66F 7/065 |
| | | | | 187/269 |
| 9,848,797 B2 * | 12/2017 | Xue | ................... | A61B 5/055 |
| 11,337,516 B1 * | 5/2022 | You | ................... | A47B 21/02 |
| 2003/0006099 A1 | 1/2003 | Boucher et al. | | |
| 2003/0150657 A1 * | 8/2003 | Shupp | ................... | B60T 7/16 |
| | | | | 180/168 |
| 2009/0078509 A1 * | 3/2009 | Olsen | ................... | B66F 7/065 |
| | | | | 414/800 |
| 2010/0012909 A1 * | 1/2010 | Lee | ................... | B66F 7/085 |
| | | | | 254/93 R |
| 2014/0027693 A1 * | 1/2014 | Hallman | ................ | B66F 7/065 |
| | | | | 254/8 C |
| 2018/0118538 A1 * | 5/2018 | Latvys | ................... | B66F 7/08 |
| 2018/0184797 A1 * | 7/2018 | Chuang | ................... | A47B 9/16 |
| 2019/0290956 A1 * | 9/2019 | Ren | ................... | A63B 22/02 |
| 2023/0337814 A1 * | 10/2023 | Lu | ................... | A47B 9/16 |

FOREIGN PATENT DOCUMENTS

| | | |
|---|---|---|
| CN | 211380037 U | 9/2020 |
| CN | 113142799 A | 7/2021 |
| CN | 213720506 U | 7/2021 |
| CN | 213757143 U | 7/2021 |

\* cited by examiner

LIFT STRUCTURE WITH ADJUSTMENT ASSISTANCE OPTIMIZED BASED ON ERGONOMICS AND INSTALLATION METHOD THEREOF

This application is a Continuation Application of PCT/CN2021/113306, filed Aug. 18, 2021, which is incorporated by reference for all purposes as if fully set forth herein.

TECHNICAL FIELD

The present invention relates to the technical field of lift desks suitable for personal computers, in particular to a lift structure with adjustment assistance optimized based on ergonomics and an installation method thereof.

BACKGROUND

In recent years, with the development and popularity of computer technology, more and more people use computers to work or study. In order to better maintain a correct working posture to prevent modern occupational diseases, there are small lift desks in the market to meet the needs of people to adjust the height during work.

These lift desks are placed on the office desk for use. The base of the desk is fixed by being supported by the office desk, the top and the base are connected through a height-adjustable lifting device formed of two sets of X-shaped cross arms. In the height adjustment process, the user changes the cross angle of the X-shaped cross-arms by applying force to the top, so as to achieve the purpose of height adjustment.

In order to realize the purpose of supporting, buffering and braking in the above-mentioned height adjustment process, gas springs are used in the existing structures to assist the above-mentioned process. Specifically, when the height adjustment is performed, the gas spring is activated by a switch installed at the bottom of the top, so that it can output power to assist the user's operation, thereby making the height adjustment process easier to control and reducing the force required. Also, the position can be locked after the height adjustment is complete.

The gas spring in the above structure effectively improves the use convenience of the small lift desk. However, due to improper installation position of the gas spring, the effect it plays cannot reach the optimal ideal state.

In view of the above problems, the designer actively researches and innovates based on years of practical experience and professional knowledge in engineering applications of such products, and with the application of theories, in order to create a lift structure with adjustment assistance optimized based on ergonomics and an installation method thereof.

SUMMARY

The present invention provides a lift structure with adjustment assistance optimized based on ergonomics, which can effectively solve the problems described in the background section. Also, the present invention provides an installation method of a lift structure with adjustment assistance optimized based on ergonomics, which has the same technical effect.

To this end, the present invention adopts technical solutions described below.

A lift structure with adjustment assistance optimized based on ergonomics, comprising a top, a base, an X-shaped cross arm and a gas spring,
- wherein the X-shaped cross arm is provided between the top and the base for adjusting the height of the top relative to the base and includes a first directional arm and a second directional arm rotating around a first rotating shaft;
- wherein one end of the gas spring rotates around a second rotating shaft fixed relative to the first directional arm, and the other end rotates around a third rotating shaft fixed relative to the second directional arm, and the first, second and third rotating axes being parallel with each other; and
- wherein the lift structure with adjustment assistance optimized based on ergonomics has a reference height between the highest height and the lowest height and, at the reference height, in a plane where an axis of the gas spring is located and is perpendicular to the respective rotating axes, the axis of the gas spring is tangent to a circumference centered on the first rotating shaft and having a set radius, with a tangent point being located on the second rotating shaft.

Further, one first directional arm is provided.

Two directional arms are provided on both sides of the first directional arm.

The lift structure further comprises a connecting rod to connect the two second directional arms, and both ends of the gas spring are rotatably fixed relative to the first directional arm and the connecting rod, respectively.

Further, the two directional arms are symmetrically provided on both sides of the first directional arm.

Further, the lift structure comprises a first mounting structure fixedly connected to the first directional arm and rotatably connected to one end of the gas spring.

Further, the first mounting structure is a plate structure provided on one side of the first directional arm.

Further, the lift structure comprises a second mounting structure fixedly connected to the connecting rod and rotatably connected to one end of the gas spring.

Further, the second mounting structure is a U-shaped structure having a notch in which the end of the gas spring is arranged.

Further, the gas spring is provided with an on/off needle valve arranged to control the expansion and contraction of the gas spring by an external force, wherein the on/off needle valve is provided at the end of the gas spring proximal to the second mounting structure.

Further, the first directional arm and the second directional arm are rotatably connected to the top and the base respectively on one side, and are linearly slidably connected to the top and the base respectively on the other side.

Further, the side on which the first directional arm and the second directional arm are rotatably connected to the top and the base respectively is the left hand side of the user when the lift desk is in use.

Further, the gas spring is provided with an on/off needle valve arranged to control the expansion and contraction of the gas spring by an external force.
- wherein the lift structure further comprises a switch structure arranged to apply a force on the on/off needle valve through a wire structure, wherein the switch structure is provided at the bottom of the top and located on the left hand side of the user when the lift desk is in use.

Further, the third rotating shaft is disposed on the side where the switch structure is located.

Further, the switch structure includes a seat and a handle, wherein the seat is fixedly connected to the bottom of the top and provides a support portion for rotational installation of the handle, and wherein the handle is rotatably connected to the support portion, such that the handle is rotated toward the bottom of the top under the action of the user, thereby driving one end of the wire structure to move, and is reset after the external force is released.

Further, the side of the handle facing away from the bottom of the top is curved in a direction extending from the rotational connection part toward the end directed to the user, wherein a concave side created by the curving faces the bottom of the top.

Further, the connection part between the handle and the wire structure, and the end are located on both sides of the rotational connection part.

Further, the linear sliding is carried out under the restriction of a guide rail on a guide block, wherein the guide block is rotatably connected to the first directional arm and the second directional arm.

An installation method of a lifting structure with adjustment assistance optimized based on ergonomics for installing the gas spring of the lift structure on the X-shaped cross arm, comprising the following steps:

determining, at the reference height, an angle between the first directional arm and the second directional arm based on the size of the first directional arm and the second directional arm;

determining, based the output force of the gas spring and the degree of assistance required by the user on the gas spring at the reference height, the length of the arm of force of the output force;

selecting, under the condition that the angle is ensured, the direction of the axis of the gas spring in the tangential direction of a circumference which takes the length of arm of force as the radius of the circumference; and determining an installation position for the second rotating shaft and the third rotating shaft based on the size of the gas spring and the direction of axis, while ensuring that the tangent point of the axis of the gas spring to the circumference is located on the second rotating shaft.

Further, the degree of assistance required is characterized by the moment of the output force of the gas spring.

Further, the moment of the output force of the gas spring is determined by a method comprising the following steps:

pushing the first directional arm by applying an external force at the reference height in the product state where no gas spring installed to obtain a limit force that rotates the first directional arm relative to the second directional arm; and calculating the moment of the output force of the gas spring based on the moment of the limit force.

With the technical solutions of the present invention, the following technical effects can be achieved.

The present invention provides a lift structure with adjustment assistance optimized based on ergonomics having a determined installation of the gas spring, whereby the effect of the gas spring can be brought into full play.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

Figure 1:
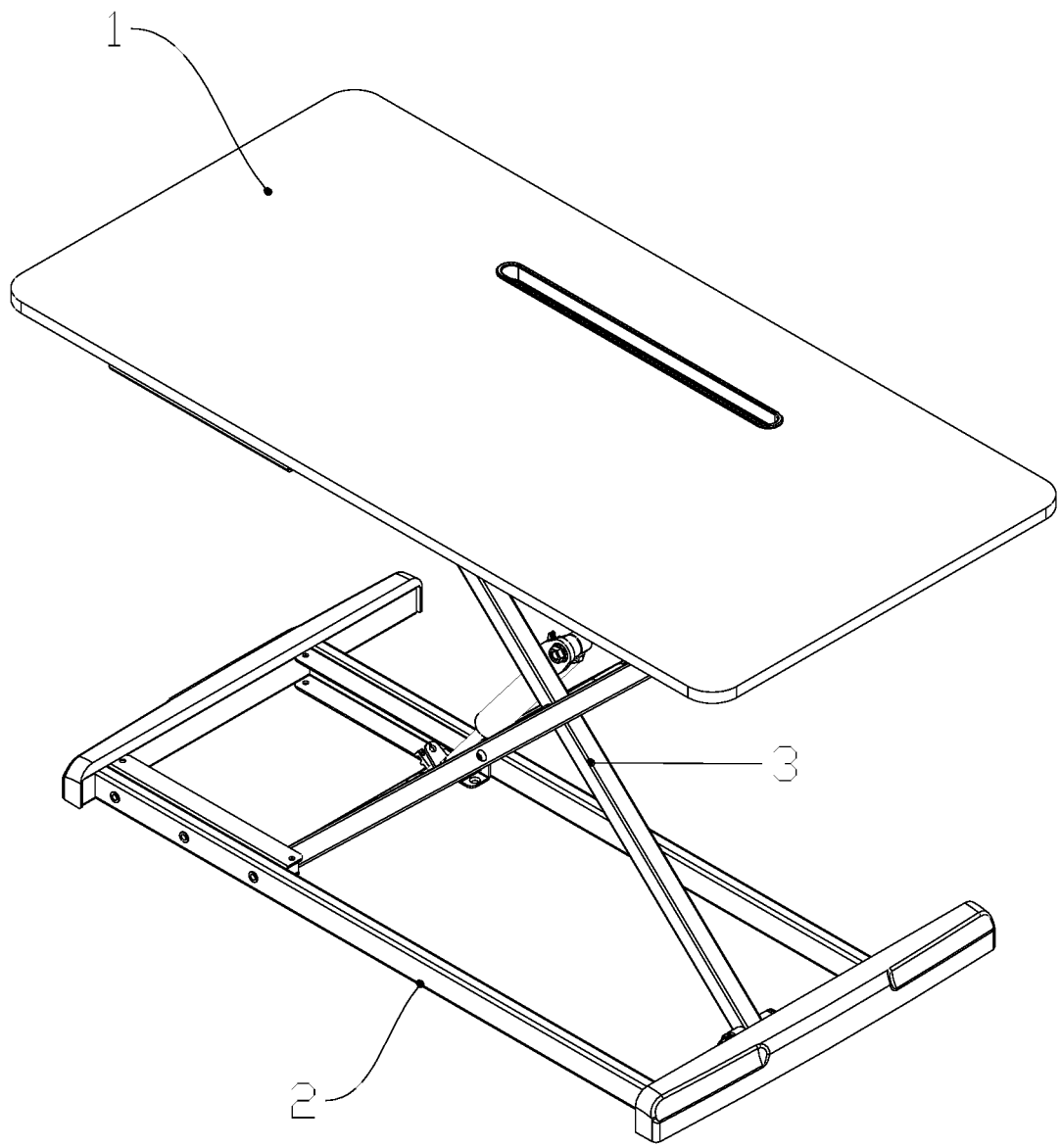
FIG. 1 is a schematic diagram of the structure of the lift structure with adjustment assistance optimized based on ergonomics.

Reference signs: 1. Top; 2. Base; 3. X-shaped cross arm; 31. First directional arm; 32. Second directional arm; 33. First rotating shaft; 34. Connecting rod; 35. First mounting structure; 36. Second mounting structure; 37. Guide rail; 38. Guide block; 4. Gas spring; 41. Second rotating shaft; 42. Third rotating shaft; 43. Axis; 44. On/off needle valve; 5. Circumference; 51. Tangent point; 6. Desk; 7. Wire clip structure; 8. Switch structure; 81. Seat; 82. Handle; 82a. Concave side; 82b. Hook structure; 82c. Notch; 9. Pen slot; 91. Pen case; 10. Tray; 11. Bracket; 12. Baffle.

DETAILED DESCRIPTION

The technical solutions in the embodiments of the present invention will be described clearly and completely in conjunction with the accompanying drawings in the embodiments of the present invention. Obviously, the described embodiments are only a part of the embodiments of the present invention, rather than all the embodiments.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Embodiment 1

As shown in FIGS. 1 to 4, a lift structure with adjustment assistance optimized based on ergonomics comprises a top 1, a base 2, an X-shaped cross arm 3 and a gas spring 4, wherein the X-shaped cross arm 3 is provided between the top 1 and the base 2 for adjusting the height of the top 1 relative to the base 2 and includes a first directional arm 31 and a second directional arm 32 rotating around a first rotating shaft 33; wherein one end of the gas spring 4 rotates around a second rotating shaft 41 fixed relative to the first directional arm 32, and the other end rotates around a third rotating shaft 42 fixed relative to the second directional arm 32, and the first, second and third rotating axes 33, 41, 42 are arranged in parallel; and wherein the lift structure with adjustment assistance optimized based on ergonomics has a reference height between the highest height and the lowest height and, at the reference height, in a plane where an axis 43 of the gas spring 4 is located and is perpendicular to the respective rotating axes, the axis 43 of the gas spring 4 is tangent to a circumference 5 centered on the first rotating shaft 33 and having a set radius, with a tangent point 51 being located on the second rotating shaft 41.

The present invention provides a lift structure with adjustment assistance optimized based on ergonomics having a determined installation of the gas spring 4, whereby the effect of the gas spring can be brought into full play.

Figure 5:
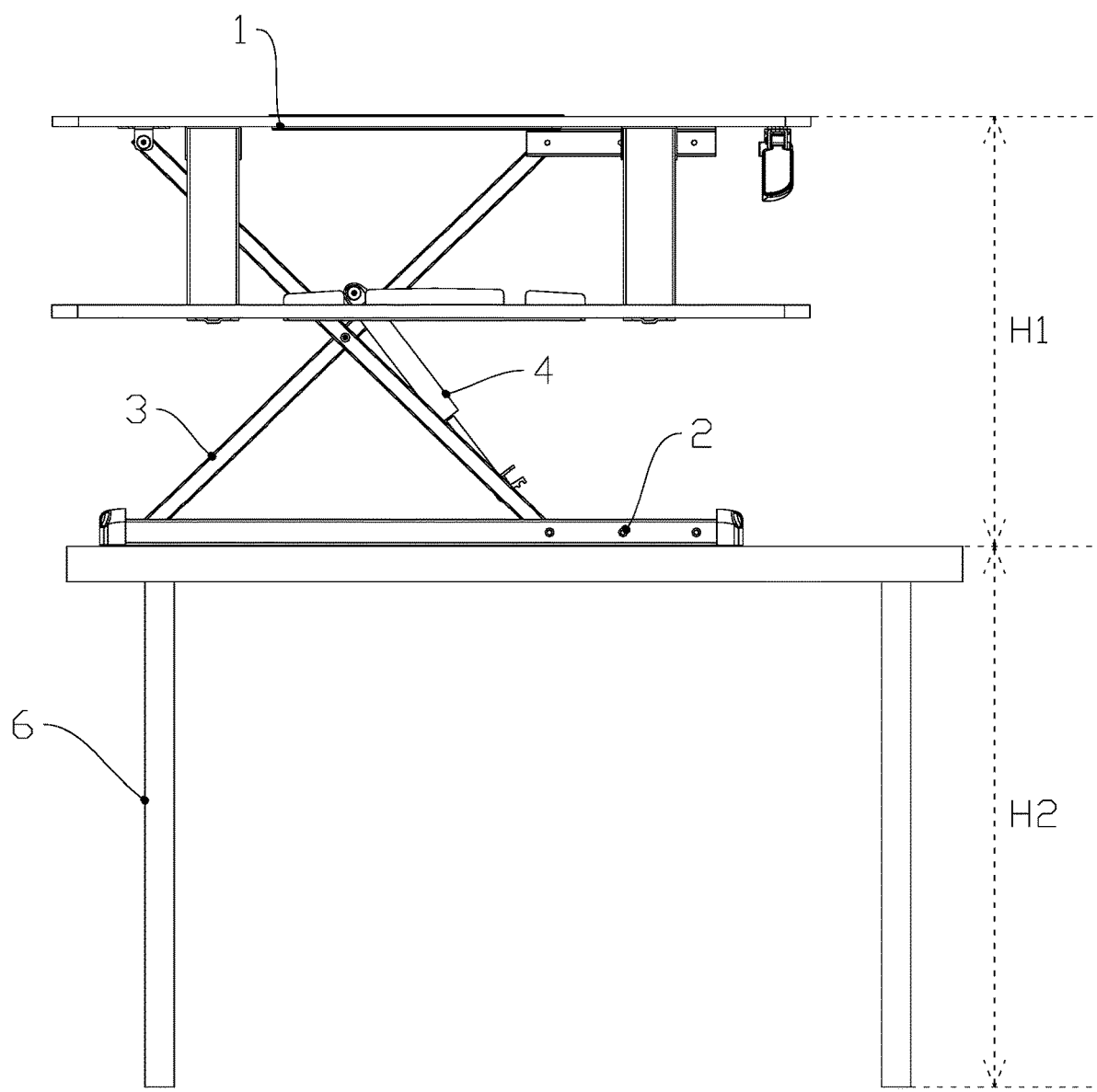
FIG. 5 is a schematic diagram of the reference height.

Referring to FIG. 5, for the selection of the reference height H1, a human body model with a standard height needs to be used as a reference. Of course, it is also necessary to assume that the desk 6 on which the lift structure with adjustment assistance optimized based on ergonomics is placed has a standard height H2. The following conditions need to be met: in the case that the lift structure with adjustment assistance optimized based on ergonomics is adjusted to the reference height H1, when the user stands on the side of the desk 6 and adjusts the height of the lift structure with adjustment assistance optimized based on ergonomics through the top 1, it is the most difficult to apply force and a smaller force will be applied compared to other height positions.

Figure 6:
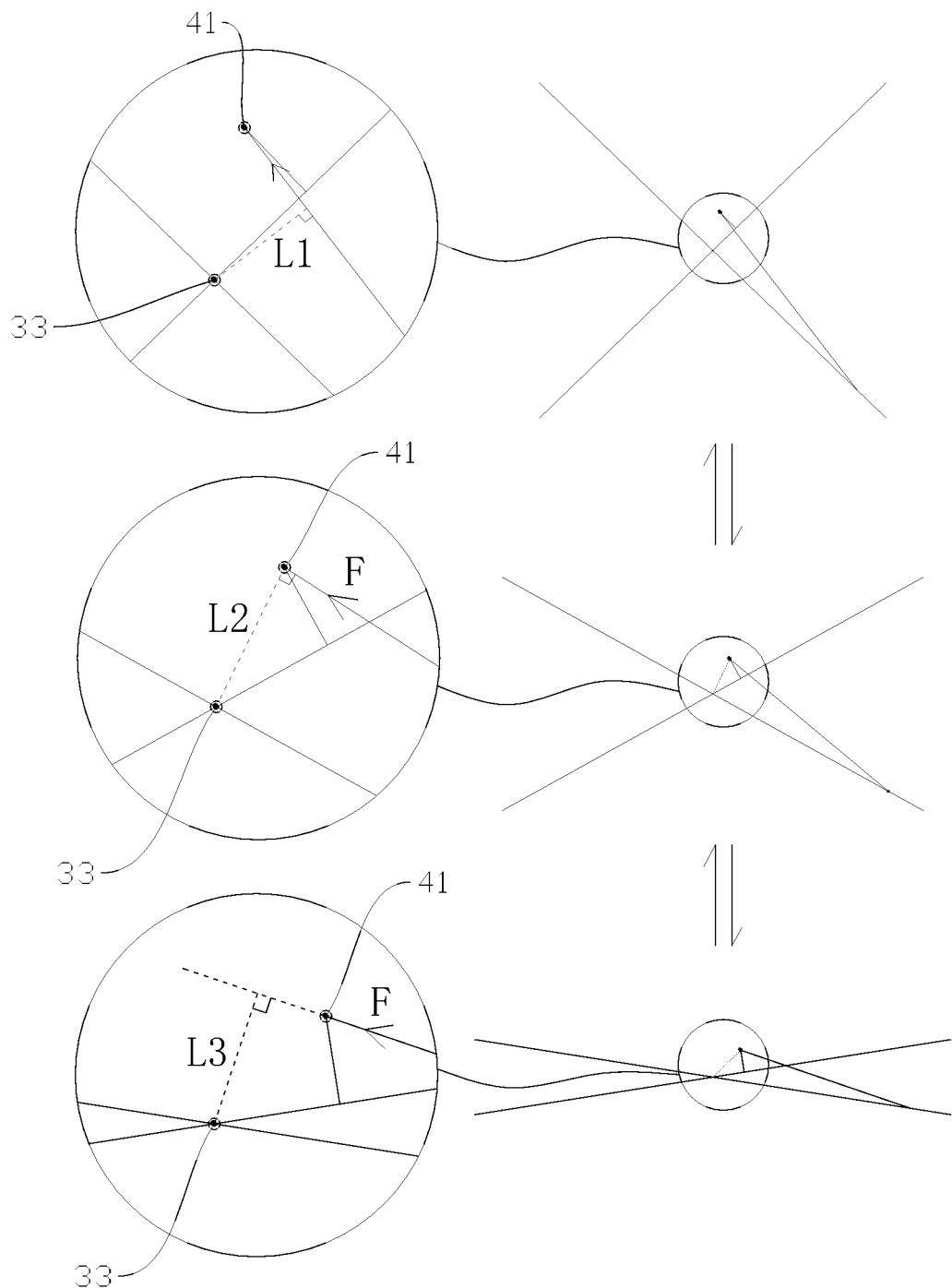
FIG. 6 is a schematic diagram of the moment change of the gas spring output force during the height change of the lift structure with adjustment assistance optimized based on ergonomics.

For the use of the gas spring 4, various factors in its design and processing are ignored in the present invention, and it is assumed that it has an ideal state in which the output force F remains unchanged throughout the stroke. In the case of the standard reference height H1 described above, the installation position of the gas spring 4 determined in the present invention can obtain the maximum moment L at the reference height H1. Specifically, FIG. 6 shows from top to bottom the process that the height of the lift structure with adjustment assistance optimized based on ergonomics gradually descends, and the reverse is the process of height rising. The middle figure shows the product structure at the reference height H1.

After the lift structure with adjustment assistance optimized based on ergonomics is installed, the distance between the first rotating shaft 33 and the second rotating shaft 41 is determined, and the distance remains unchanged regardless of the relative rotation of the first directional arm 31 and the second directional arm 32. In FIG. 6, the distance is embodied by the length between two points of the first rotating shaft 33 and the second rotating shaft 41. In the top and bottom figures of FIG. 6, the length is obviously larger than the arm of force L1 and the arm of force L3, while in the middle figure, the length is equal to the arm of force L2, that is, the radius of the circumference 5, in which case the gas spring 4 can output the maximum moment, thereby providing the maximum assistance to the user to alleviate the difficulty in applying force due to physiological reasons by the human body, offering a better operating experience.

In the present invention, under the premise of ergonomics being fully considered, an optimal solution is provided for the installation of the gas spring 4 to effectively bring the use effect of the gas spring 4 into play.

Figure 2:
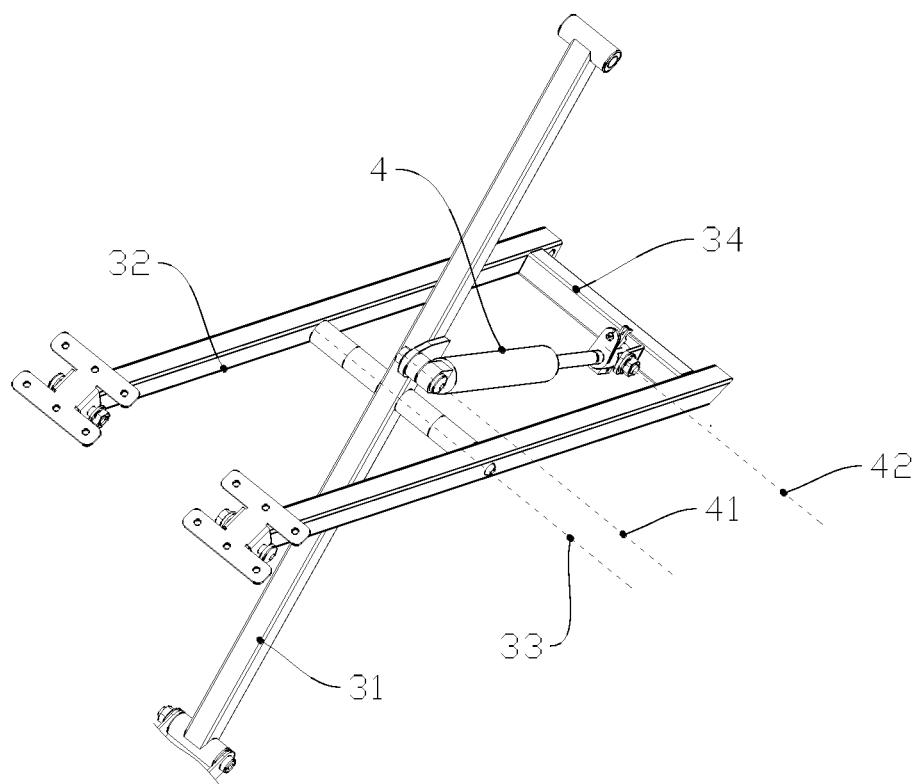
FIG. 2 is a schematic diagram of the connection of the X-shaped cross-arms and the gas spring.
Figure 3:
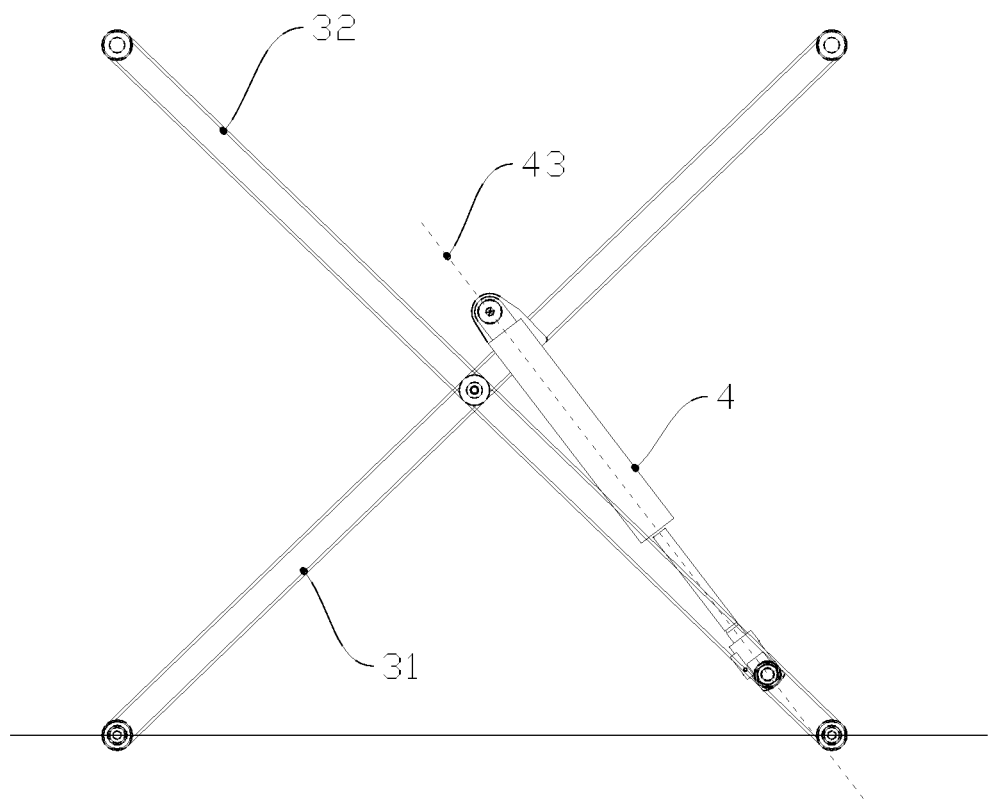
FIG. 3 is a front view of the connection of the X-shaped cross-arms and the gas spring.
Figure 4:
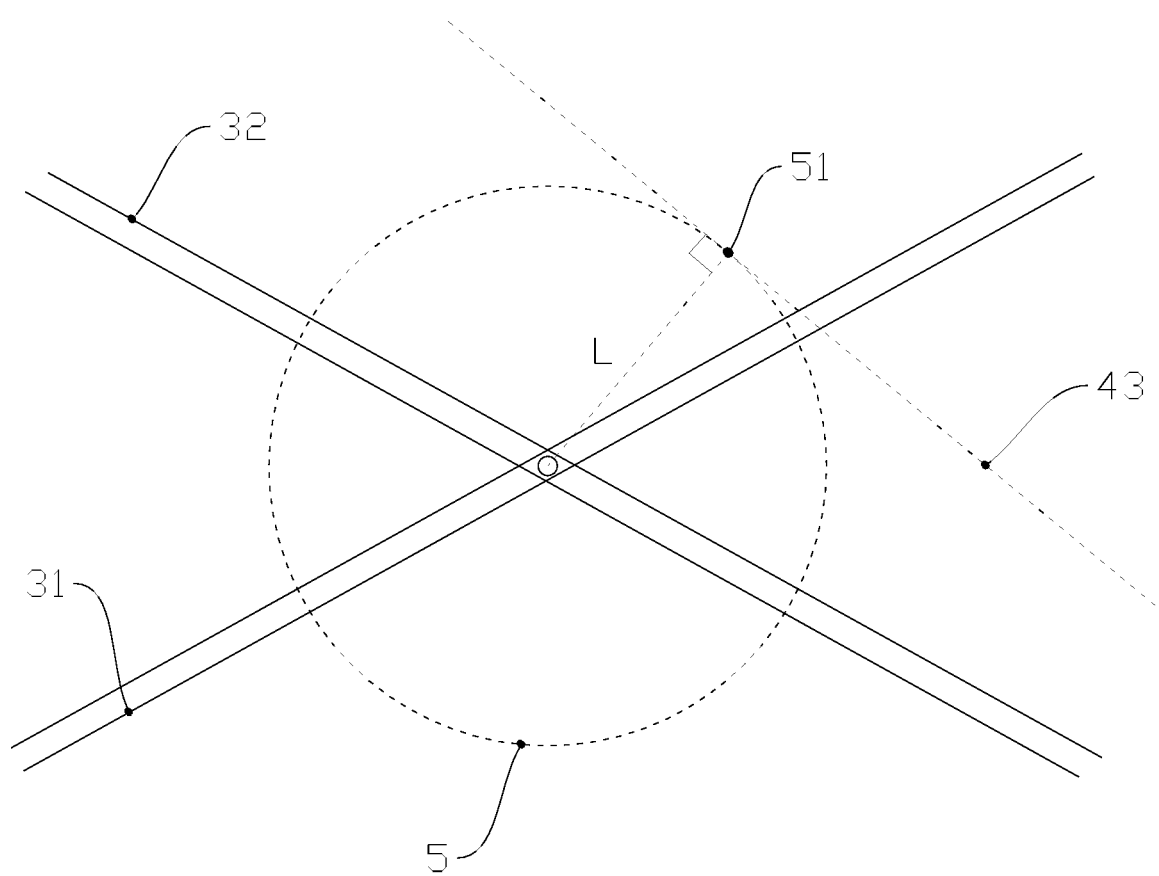
FIG. 4 is a schematic diagram of the circumference and the position of the tangent point.
Figure 7:
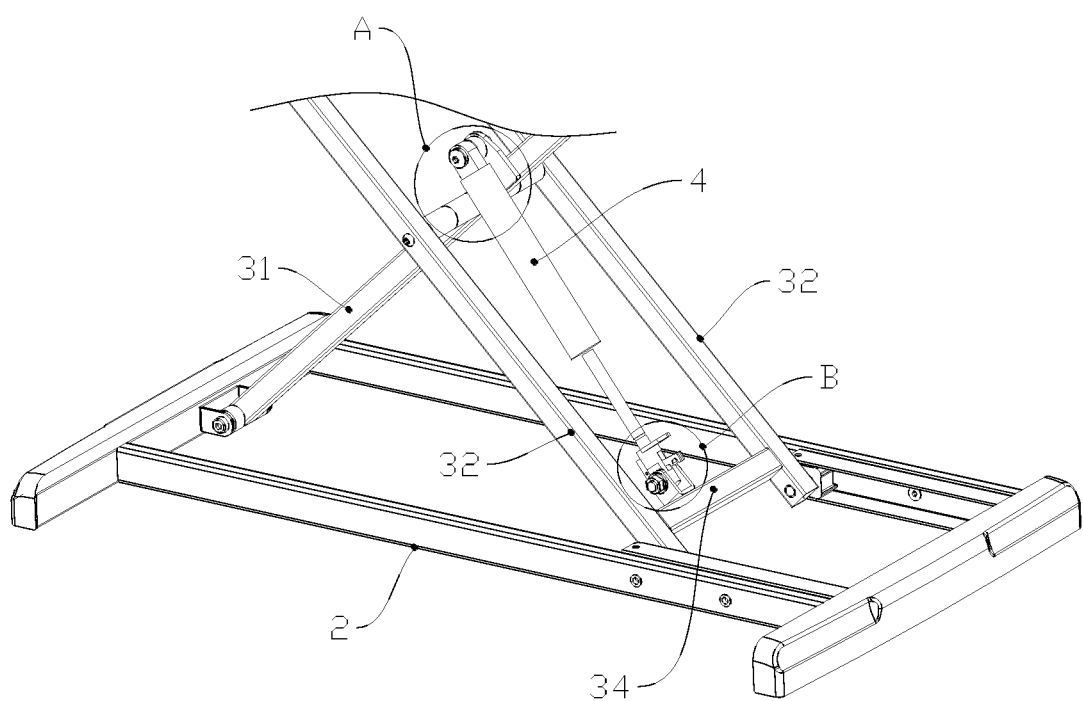
FIG. 7 is a schematic diagram of the bottom of the lift structure with adjustment assistance optimized based on ergonomics.

Through the optimization of the entire force application process of the user in the above embodiment, the use process of the lift structure with adjustment assistance optimized based on ergonomics is made more stable, and the stability reduces the requirement on the strength of the lift structure with adjustment assistance optimized based on ergonomics to a certain extent. Therefore, as a preferred embodiment, as shown in FIGS. 2 and 7, the lift structure comprises one first directional arm 31, two directional arms 32 provided on both sides of the first directional arm 31, and a connecting rod 34 to connect the two second directional arms, wherein both ends of the gas spring 4 are rotatably fixed relative to the first directional arm 31 and the connecting rod 34, respectively.

Compared with the prior art, the above described structure reduces the use of one first directional arm 31, thus reducing the material cost, processing cost and transportation cost of the product while providing the same use experience as the four-arm mechanism. Of course, the rotational connection between the first directional arm 31 and the second directional arm 32 needs to be realized by a shaft structure. In addition, on the basis of ensuring the structural strength, the cross-sectional dimensions of the first directional arm 31 and the second directional arm 32 can also be appropriately reduced compared to the existing product structure. For the three-arm structure described, the provision of the connecting rod 34 realize double technical effects. On the one hand, it facilitates the installation of the gas spring 4, and on the other hand, it enables integrity of the two second directional arms 32, making them more stable and easy to control. The installation of the connecting rod 34 relative to the two second directional arms 32 can be achieved by welding or connecting pieces.

In order to further ensure the structural stability, the two second directional arms 32 are symmetrically provided on both sides of the first directional arm 31.

Figure 8:
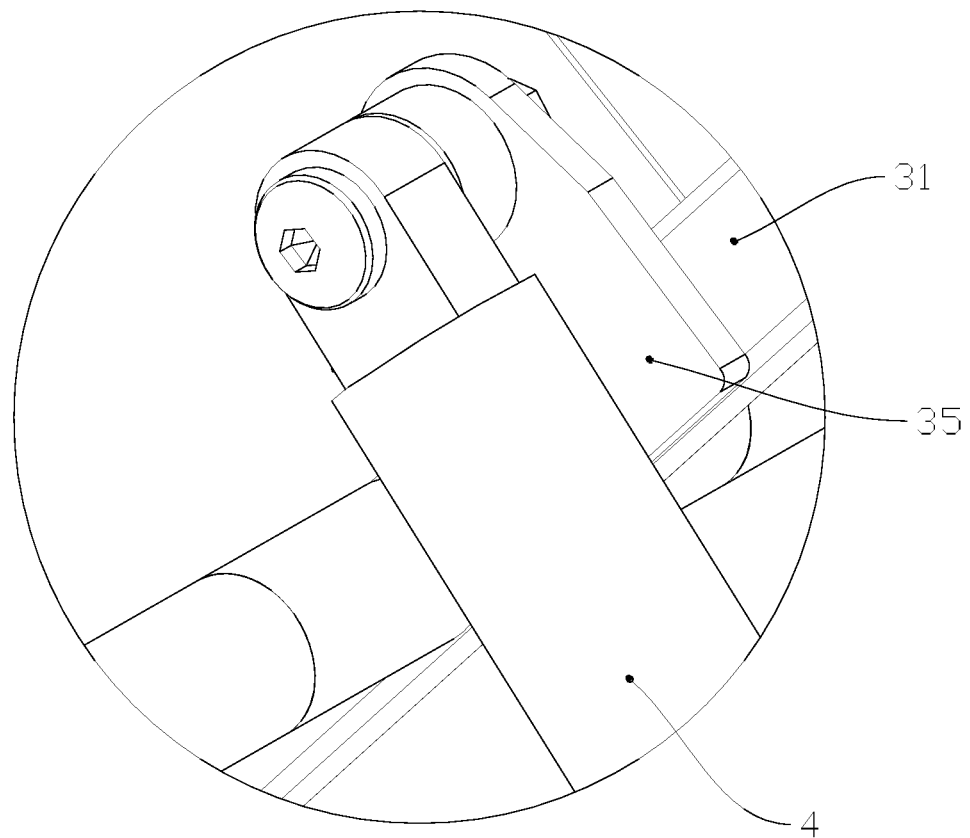
FIG. 8 is a partially enlarged view at A in FIG. 7.

For different usage requirements, under the condition of the same height of the lift structure with adjustment assistance optimized based on ergonomics, there may be changes in the size of the desk board, which will inevitably affect the size of the base 2 and the two arms. In order to realize more flexible and convenient installation of the gas spring 4 in structures of various sizes, as shown in FIGS. 7 and 8, the lift structure with adjustment assistance optimized based on ergonomics further comprises a first mounting structure 35 fixedly connected to the first directional arm 31 and rotatably connected to one end of the gas spring 4. Through the size change of the first mounting structure 35, the degree of change of other structures can be compensated, so that the gas spring 4 of the same model can be used in products with a larger size range. For the fixed connection between the first mounting structure 35 and the first directional arm 31, any one of the methods in the prior art, including welding and connecting pieces, can be adopted, and the technical effect of the present invention can be achieved.

In order to avoid interference between the gas spring 4 and the first directional arm 31, the gas spring 4 is arranged on one side of the first directional arm 31. Under this positional relationship, a simplest form of the first mounting structure 35 is provided, that is, the first mounting structure 35 is a plate structure and is arranged on one side of the first directional arm 31. By changing the thickness of the plate structure, the demand for change in strength can be satisfied. In addition, this light weight structure can also reduce the control difficulty caused by the asymmetry of the overall structure.

Figure 9:
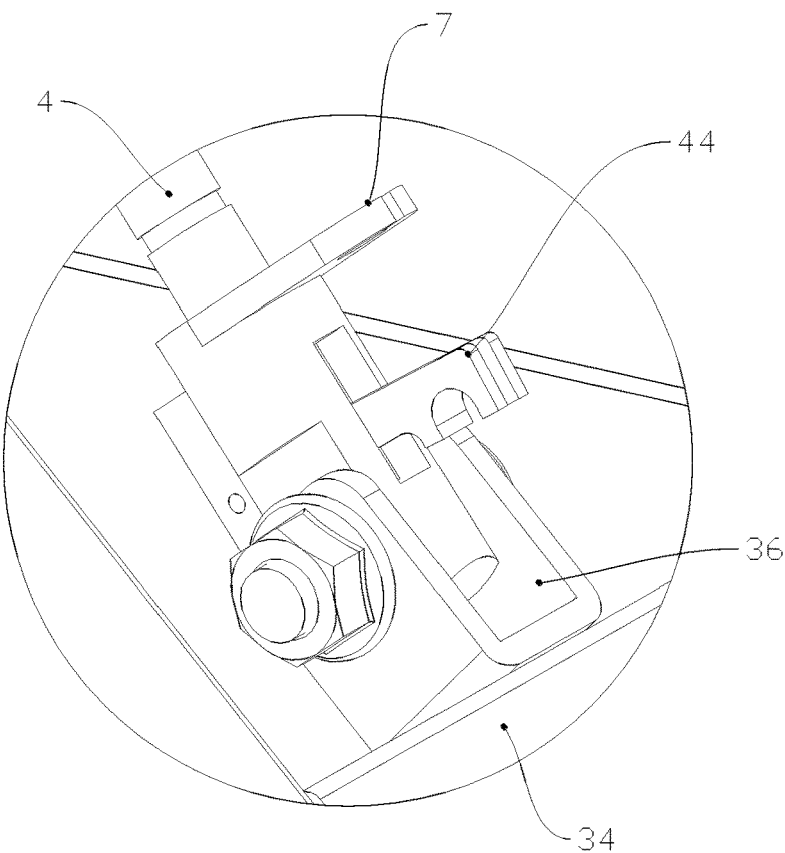
FIG. 9 is a partially enlarged view of FIG. 7 at B.

As shown in FIGS. 7 and 9, the lift structure with adjustment assistance optimized based on ergonomics further comprises a second mounting structure 36 fixedly connected to the connecting rod 34 and rotatably connected to one end of the gas spring 4. The purpose of the second mounting structure 36 is the same with that of the first mounting structure 35 and will not be described here. The second mounting structure 36 differs from the first mounting structure 35 in that the mounting space of the second mounting structure 36 is larger. Therefore, in order to obtain greater strength, the second mounting structure 36 is a U-shaped structure having a notch in which the end of the gas spring 4 is arranged. This structure makes the fixation of one end of the gas spring 4 more stable, and such stability also improves the mounting stability of the other end of the gas spring 4 to a certain extent.

As a preferred embodiment, the gas spring 4 is provided with an on/off needle valve 44 arranged to control the expansion and contraction of the gas spring 4 by external force, wherein the on/off needle valve 44 is provided at the end of the gas spring 4 proximal to the second mounting structure 36. The on-off needle valve 44 will be subjected to external force during use, therefore, a more stable structure can be obtained by arranging it on the side where the second mounting structure 36 is located, ensuring that the U-shaped structure offers stable and reliable support during repetitive operation.

Embodiment 2

A lift structure with adjustment assistance optimized based on ergonomics comprises a top 1, a base 2, an X-shaped cross arm 3 and a gas spring 4, wherein the X-shaped cross arm 3 is provided between the top 1 and the base 2 for adjusting the height of the top 1 relative to the base 2 and includes a first directional arm 31 and a second directional arm 32 rotating around a first rotating shaft 33; wherein one end of the gas spring 4 rotates around a second rotating shaft 42 fixed relative to the first directional arm 32, and the other end rotates around a third rotating shaft 42 fixed relative to the second directional arm 32, and the first, second and third rotating axes 33, 41, 42 are arranged in parallel; and wherein the lift structure with adjustment assistance optimized based on ergonomics has a reference height between the highest height and the lowest height and, at the reference height, in a plane where an axis 43 of the gas spring 4 is located and is perpendicular to the respective rotating axes, the axis 43 of the gas spring 4 is tangent to a circumference 5 centered on the first rotating shaft 33 and having a set radius, with a tangent point 51 being located on the second rotating shaft 41.

In this embodiment, the technical effect of the above structure is the same as that in Embodiment 1 and will not be described here.

In the process of implementation, the height adjustment is realized by changing the angle between the first directional arm 31 and the second directional arm 32. The distance between the top and bottom of the two arms changes with the change of the height. Different from Embodiment 1, in order to facilitate control of the lift structure with adjustment assistance optimized based on ergonomics during the process of the change, in this embodiment the first directional arm 31 and the second directional arm 32 are rotatably connected to the top 1 and the base 2 on one side, respectively, and are linearly slidably connected to the top 1 and the base 2 on the other side, respectively. In this structure, the side where the first directional arm 31 and the second directional arm 32 are rotationally connected with the top 1 and the base 2 serves as the basis for position control, and the lateral position does not change with respect to the user, so that the user's force on this side can be relatively reduced the user only needs to maintain the balance of the entire structure during the height change. According to the behavior habits of most people, the side where the first directional arm 31 and the second directional arm 32 are rotationally connected with the top 1 and the base 2 is the left hand side of the user when the lift desk is in use.

Figure 10:
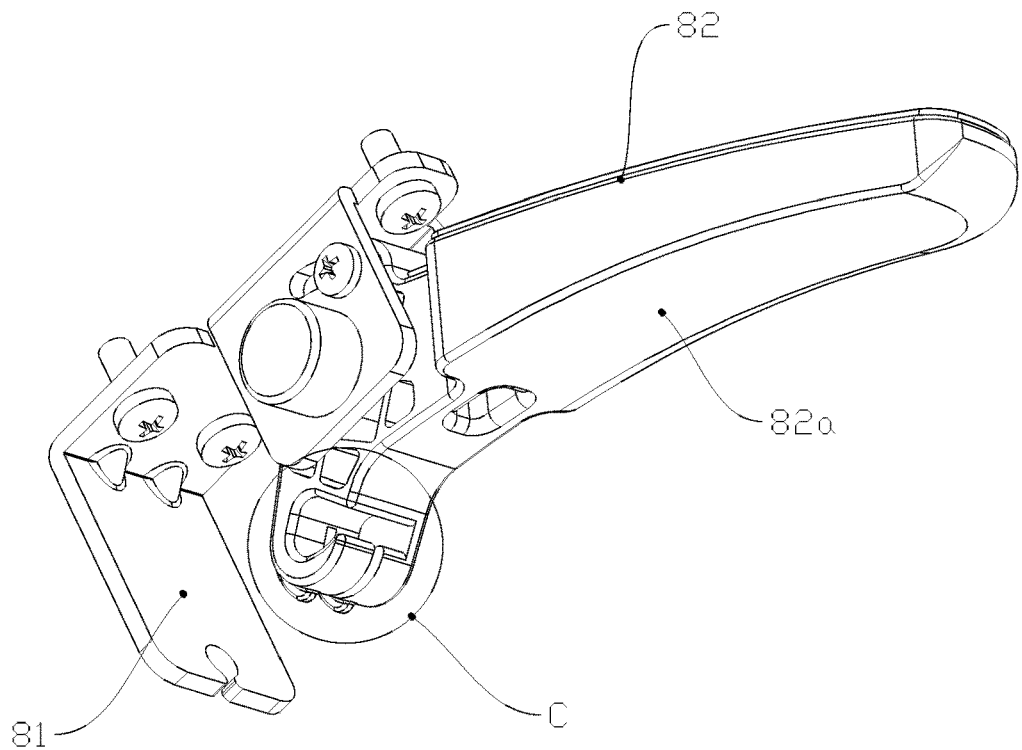
FIG. 10 is a schematic diagram of one structure of the switch structure.

The gas spring 4 is provided with an on/off needle valve 44 which controls the expansion and contraction of the gas spring 4 by an external force. As shown in FIG. 10, the lift structure further comprises a switch structure 8 arranged to apply a force on the on/off needle valve 44 through a wire structure, wherein the switch structure 8 is provided at the bottom of the top 1 and located on the left hand side of the user when the lift desk is in use. With the provision of the on/off needle valve 44, the expansion and contraction of the gas spring 4 can be kept at any desired position, effectively controlling the expansion and contraction length of the gas spring 4. The switch structure 8 is arranged on the right hand side, which is more in line with the operating habits of most people, so that the left and right hands can achieve balance control and adjustment of force output, which is more ergonomic and improves the use comfort.

As a preferred embodiment, the third rotating shaft 42 is arranged on the side of the switch structure 8. In this way, the assistance function of the gas spring 4 is restricted to be realized on the right hand side, so that a better effect can be achieved.

In order to ensure that the wire structure will not affect the use of the lift desk, a wire clamp structure 7 may be provided at any required positions including the gas spring 4, the two arms and the bottom of the top 1 to realize the fixation of the wire structure, as shown in FIG. 9. In order to reduce the connection difficulty between the wire structure and the on/off needle valve 44, a groove may be provided at an end of the on/off needle valve 44 to facilitate the limit and fixation of the end of the wire structure.

As a preferred embodiment, as shown in FIG. 10, the switch structure 8 includes a seat 81 and a handle 82, wherein the seat 81 is fixedly connected to the bottom of the top 1 and provides a support portion for rotational installation of the handle 82, and wherein the handle is rotatably connected to the support portion, such that the handle is rotated toward the bottom of the top 1 under the action of the user, thereby driving one end of the wire structure to move, and is reset after the external force is released. The seat 81 may be fixedly connected with the top 1 through a connecting piece, and the strength can be enhanced by providing a rib structure in its structure. In order to guide the wire structure, additional guide holes may also be provided, wherein the guide holes may be directly provided on the rib structure. The position of the support portion is selected so that the user can apply force to the top 1 and the handle 82 at the same time after the switch structure 8 is installed. The user can rotate the handle 82 toward the top 1 by external force, and at the same time, rise or lower the top 1. In this process, the on/off needle valve 44 is activated and the gas spring 4 realizes the assistance function.

The reset can be realized actively by elastic reset of, for example, a spring structure, or passively by being driven by the wire structure when the on/off valve needle is reset, or both active reset and passive reset can be realized at the same time.

The side of the handle 82 facing away from the bottom of the top 1 is curved in a direction extending from the rotational connection part toward the end directed to the user, wherein a concave side 82a created by the curving faces the bottom of the top 1. This curved state makes the user's force more stable, and the sliding can be avoided by the restriction of the concave side 82a, so as to ensure the stability of the force application process.

As a preferred embodiment, the connection part between the handle 82 and the wire structure, and the end are located on both sides of the rotational connection part. In this way, the lever effect is achieved, so that the user can apply less force to the handle 82, improving the sensitivity of operation and reducing the difficulty of operation.

Figure 11:
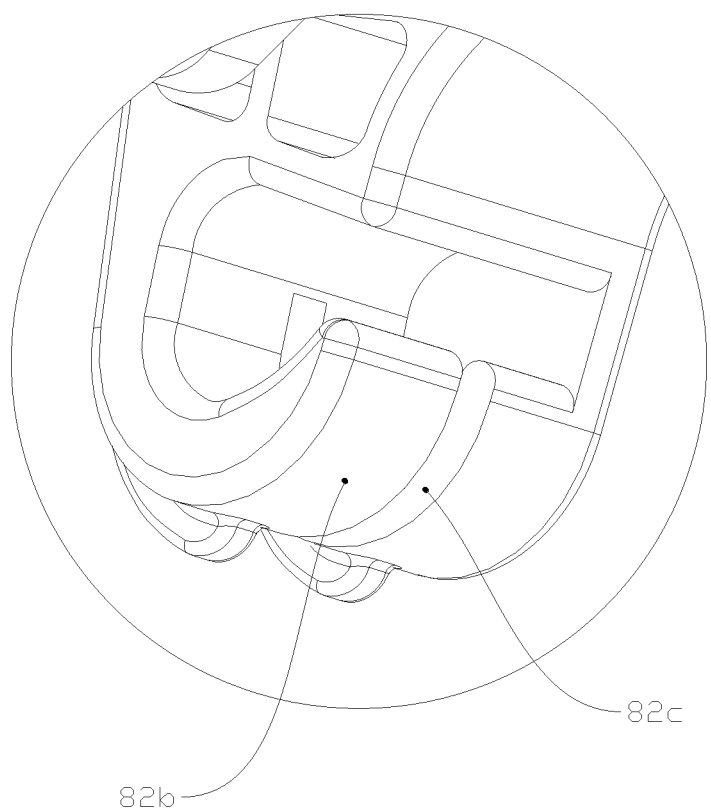
FIG. 11 is a partially enlarged view at C in FIG. 10.

For the installation of the wire structure, in addition to providing a groove at the end of the on/off needle valve 44 to reduce the installation difficulty, a structure that is convenient for connection may also be provided at the end of the handle 82. Specifically, as shown in FIG. 11, a hook structure 82B may be provided at the end of the handle 82, and a notch 82C may be formed by retracting inward from the edge of the hook structure 82B to allow the wire structure to enter, so that after the end of the wire structure reaches the hook structure 82B, it is clamped in the hook structure 82B by force, and the notch 82C can restrict the end of the wire structure.

Figure 12:
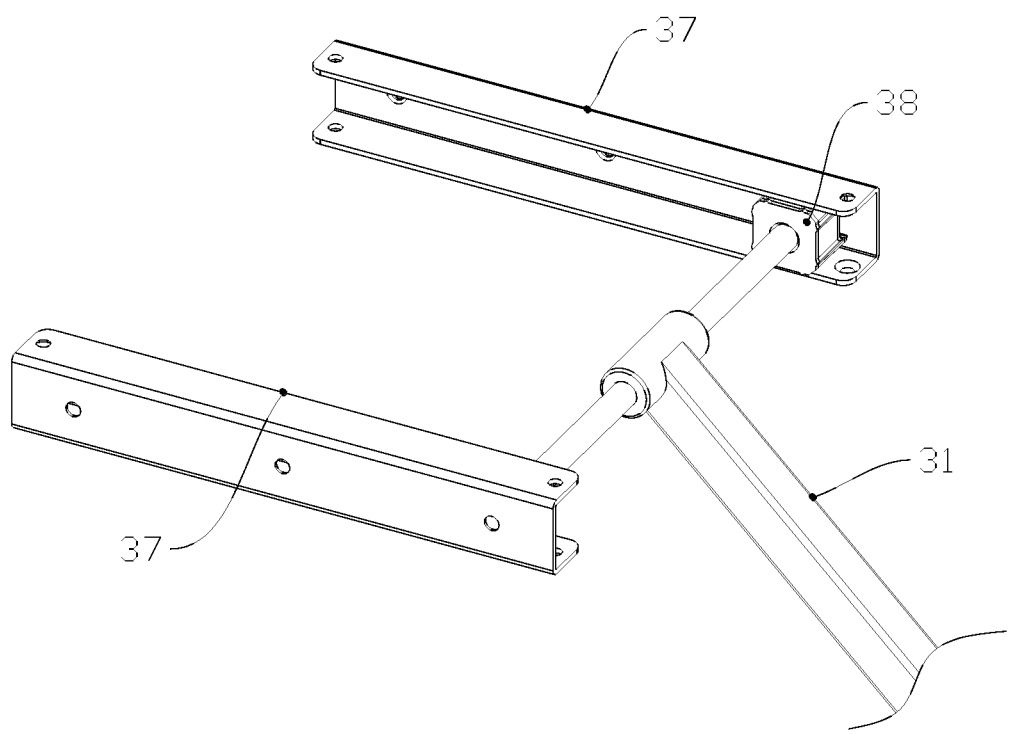
FIG. 12 is a schematic diagram of the installation mode of the guide rail and the guide block.
Figure 13:
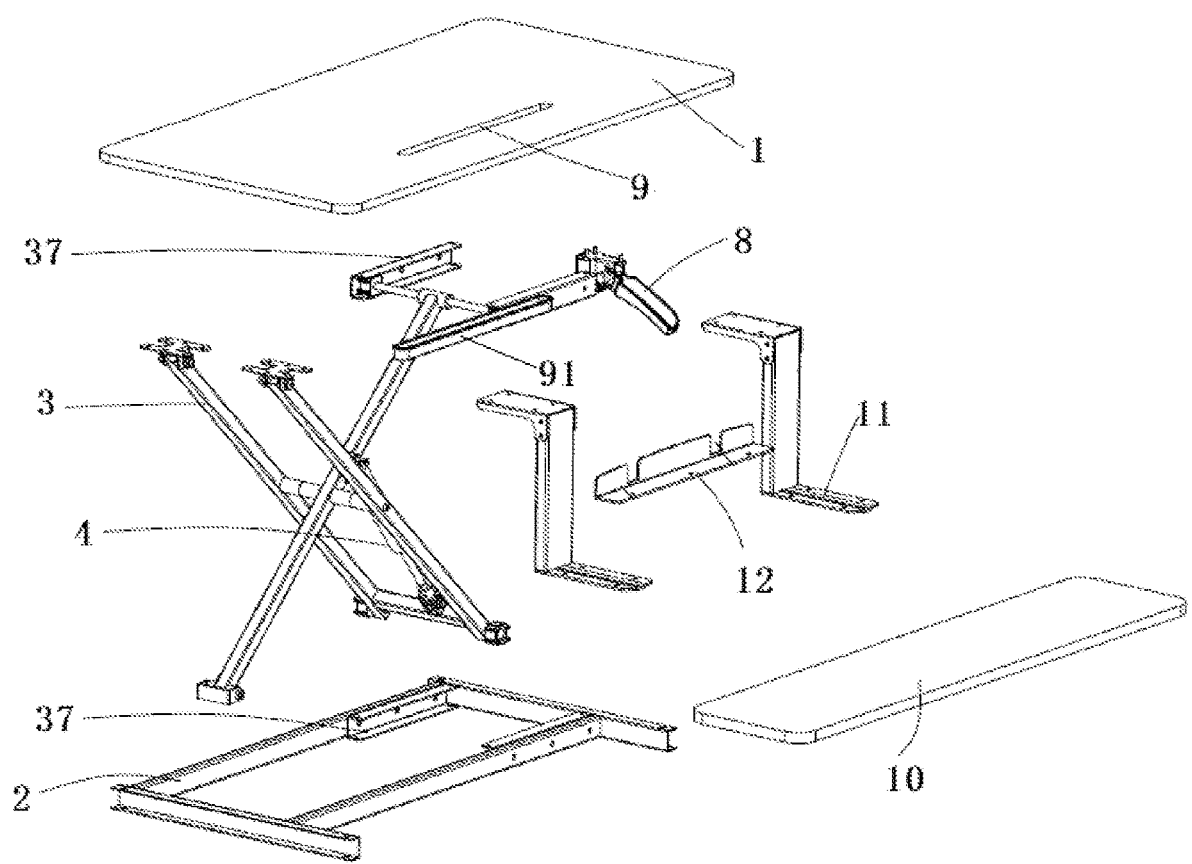
FIG. 13 is an exploded schematic diagram of the lift structure with adjustment assistance optimized based on ergonomics, including ancillary structures.
Figure 14:
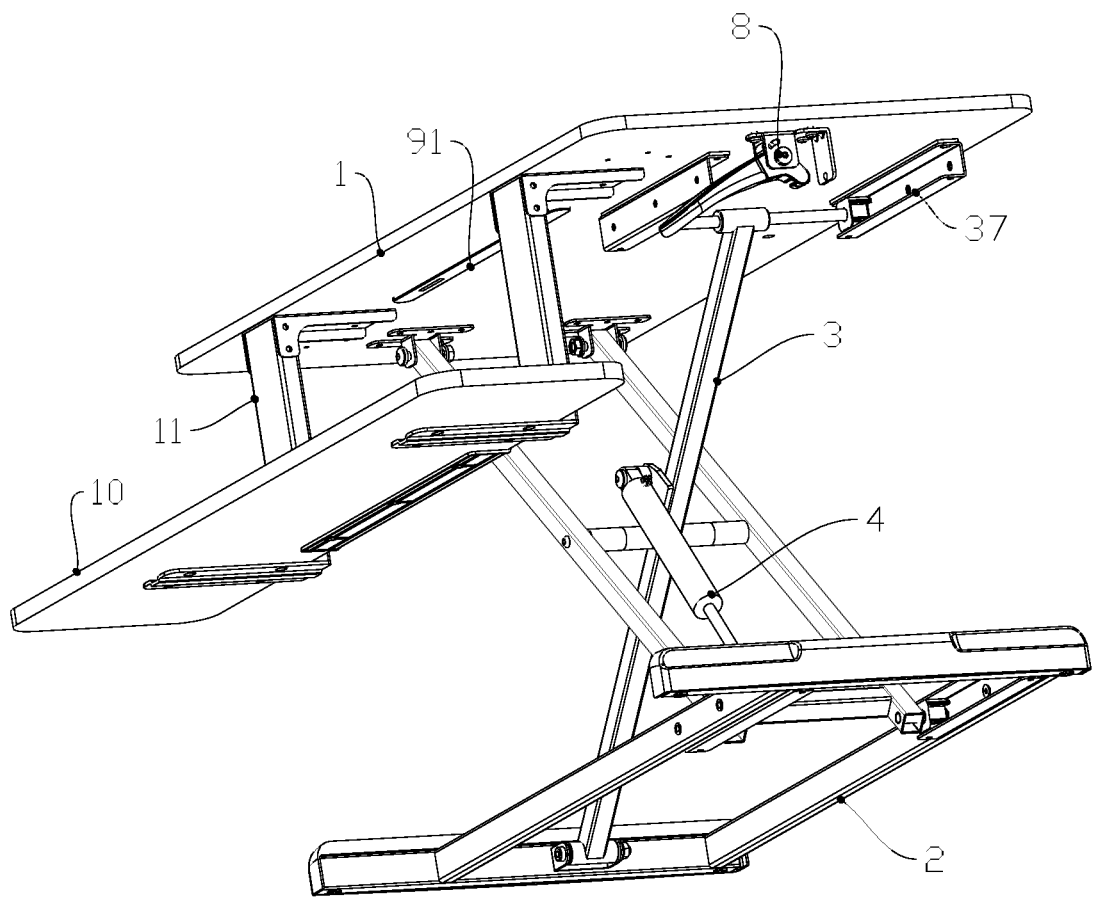
FIG. 14 is a schematic diagram of the structure of the lift structure with adjustment assistance optimized based on ergonomics, including ancillary structures.
Figure 15:
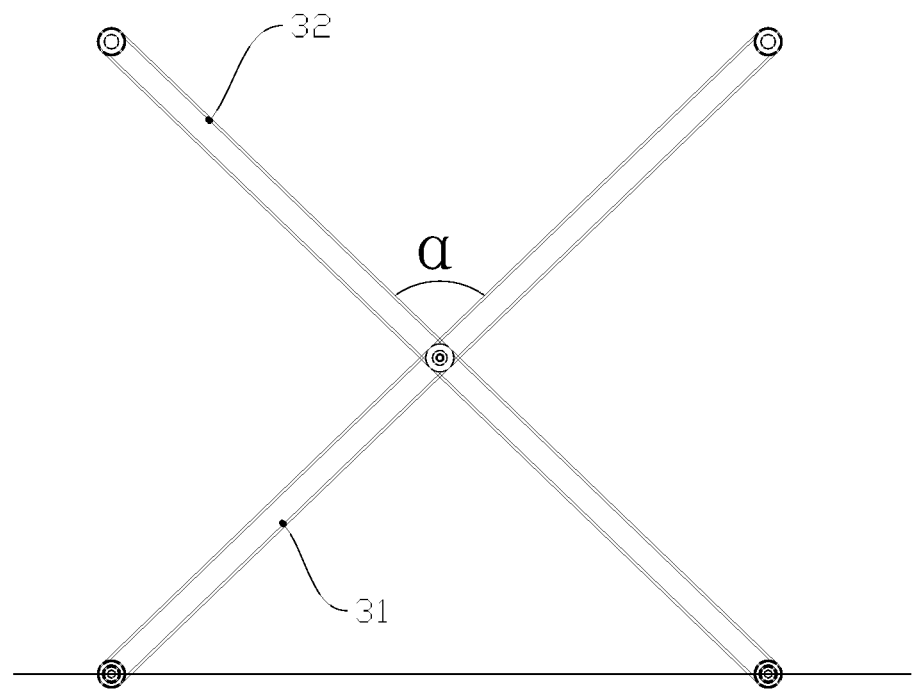
FIG. 15 is a schematic diagram of the angle between the first directional arm and the second directional arm.
Figure 16:
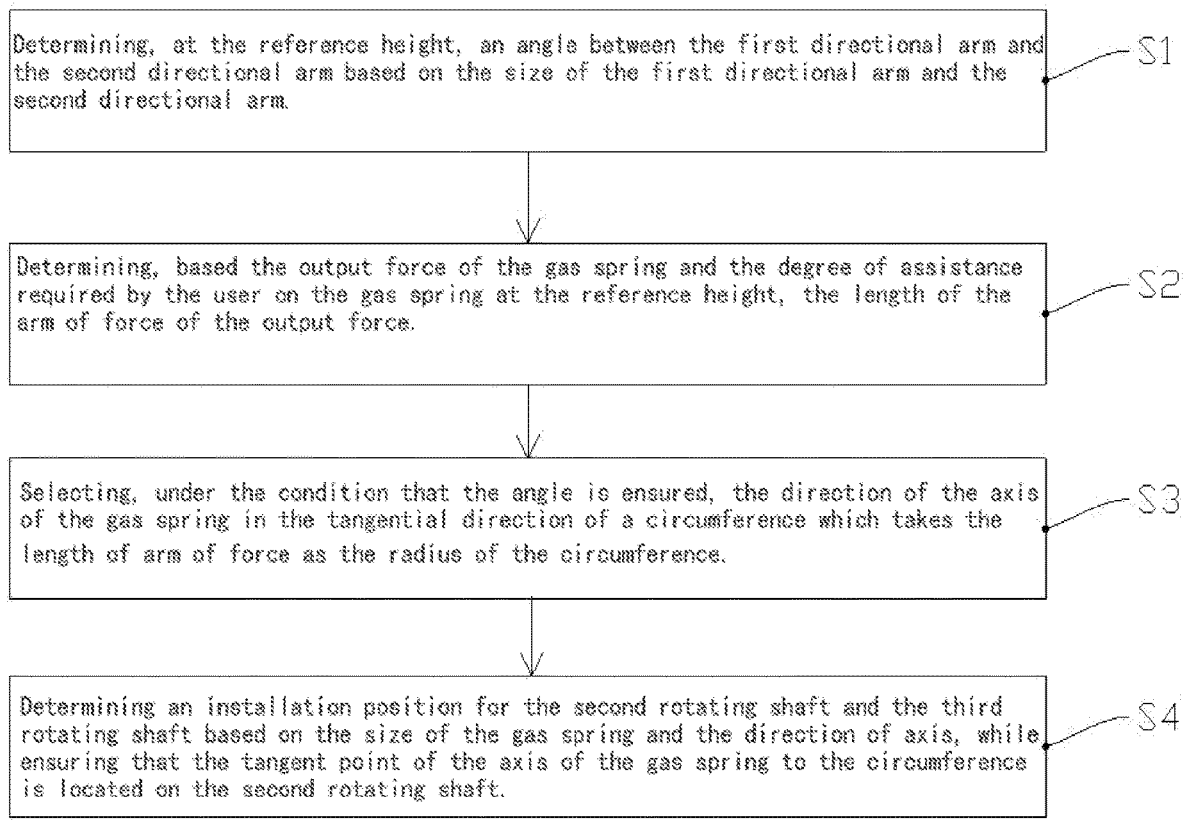
FIG. 16 is a flowchart of an installation method of the lift structure with adjustment assistance optimized based on ergonomics.

As a preferred embodiment, as shown in FIG. 12, the linear sliding is carried out under the restriction of a guide rail 37 on a guide block 38, wherein the guide block 38 is rotatably connected to the first directional arm 31 and the second directional arm 32. The guide rail 37 may be mounted on the top 1 and the base 2, respectively. The U-shaped guide rail 37 is the structural form used in this embodiment, in which the rotational connection of the guide block 38 with and the first directional arm 31 and the second directional arm 32 may be realized in a fitted way, or as shown in FIG. 12, the rotational connection with the first directional arm 31 may be realized by a rod structure protruding from the first directional arm 31. The guide rail 37 may at least limit the top and bottom of the guide block 38.

With the lift structure with adjustment assistance optimized based on ergonomics according to Embodiment 1 and Embodiment 2, a better user experience can be achieved. However, in order to further improve the use comfort of the product, the following auxiliary structures can also be provided as optimizations:

A pen slot 9 formed concavely from the upper end surface of the top 1. In order to improve the aesthetics and reduce the processing difficulty of the top 1, a pen case 91 may be provided in the pen slot 9, so as to shield the damaged part of the pen slot 9 caused by material removal.

A bracket 11 and a tray 10, wherein one end of the bracket 11 is connected to the lower end face of the top 1, the other end of the bracket 11 extends vertically from the top 1 and is connected to the tray 10 at the end of extension, and the tray 10 extends horizontally in the direction away from the top 1. The tray 10 may realize the placement of the keyboard or other office supplies, increasing the storage area of the product, and may also be used only for supporting parts such as elbows. In order to prevent the articles from falling, a baffle 12 is further provided, which is arranged at the edge of the tray 10 to form a boundary restriction.

Embodiment 3

An installation method of a lift structure with adjustment assistance optimized based on ergonomics according to Embodiments 1 and 2 for installing the gas spring 4 of the lift structure on the X-shaped cross arm 3, comprising the following steps:

S1 of determining, at the reference height H1, an angle α between the first directional arm 31 and the second directional arm 32 based on the size of the first directional arm 31 and the second directional arm 32. In this step, it is necessary to combine the first directional arm 31, the second directional arm 32 and the reference height H1 to determine the angle, and any change in the above-mentioned dimensions will cause a change in the angle α.

S2 of determining, based the output force F of the gas spring 4 and the degree of assistance required by the user on the gas spring 4 at the reference height H1, the length of the arm of force L of the output force F. As described in the above embodiments, in the present invention, various factors in the design and processing process are ignored. It is assumed that the gas spring 4 has an ideal state in which the output force F remains unchanged throughout the stroke. When the gas spring 4 is selected, the output force F is determined. In this embodiment, the degree of assistance is represented by the moment M of the output force F of the gas spring 4, M=FL. The arm of force L is the shortest distance between the first rotating shaft 33 and the line of action of the output force F.

S3 of selecting, under the condition that the angle α is ensured, the direction of the axis 43 of the gas spring 4 in the tangential direction of a circumference 5 which takes the length of arm of force L as the radius of the circumference 5;

S4 of determining an installation position for the second rotating shaft 41 and the third rotating shaft 42 based on the size of the gas spring 4 and the direction of axis, while ensuring that the tangent point of the axis 43 of the gas spring 4 to the circumference 5 is located on the second rotating shaft 41. In this step, it is still necessary to ensure that the above-mentioned angle α is determined. Among the many tangential directions, it is necessary to select the most suitable position for installing the selected gas spring 4 relative to the first directional arm 31 and the second directional arm 32. This position can ensure that at the reference height H1, in the case that the lift structure with adjustment assistance optimized based on ergonomics is adjusted to the reference height H1, when the user stands on the side of the desk 6 and adjusts the height of the lift structure with adjustment assistance optimized based on ergonomics through the top 1, it is the most difficult to apply force and a smaller force will be applied compared to other height positions.

The installation of the gas spring 4 may be performed at any angle between the first directional arm 31 and the second directional arm 32 after the position relative to the first directional arm 31 and the second directional arm 32 is determined.

As a preferred embodiment, the moment M of the output force F of the gas spring 4 is determined by a method comprising the following steps: pushing the first directional arm 31 by applying an external force at the reference height H1 in the product state where no gas spring installed to obtain a limit force that rotates the first directional arm 31 relative to the second directional arm 32; and calculating the moment M of the output force F of the gas spring 4 based on the moment of the limit force.

In the preferred embodiment, the state of the product without the gas spring 4 is shown as including all the other structures that the user needs to control during the height adjustment without the assistance of the gas spring 4. Through the collection of the above-mentioned limit force and the shortest distance between the first rotating shaft 33 and the action line of the limit force, the moment of the limit force can be calculated. This moment can reflect the difficulty of relative rotation of the first directional arm 31 and the second directional arm 32 at the reference height H1 and therefore can be used as the basis for calculating the moment M of the output force F of the gas spring 4. Specifically, the moment M can be obtained by means of equal scaling.

The basic principles, main features and advantages of the present invention have been shown and described above. Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A lift structure with adjustment assistance optimized based on ergonomics, comprising a top, a base, an X-shaped cross arm and a gas spring,
    wherein the X-shaped cross arm is provided between the top and the base for adjusting the height of the top relative to the base and includes a first directional arm and two second directional arms rotating around a first rotating shaft;
    wherein one end of the gas spring rotates around a second rotating shaft fixed relative to the first directional arm, and the other end rotates around a third rotating shaft fixed relative to the second directional arms, and the first, second and third rotating axes being parallel with each other;
    wherein the lift structure with adjustment assistance optimized based on ergonomics has a reference height between the highest height and the lowest height and, at the reference height, in a plane where an axis of the gas spring is located and is perpendicular to the respective rotating axes, the axis of the gas spring is tangent to a circumference centered on the first rotating shaft and having a set radius, with a tangent point being located on the second rotating shaft; and
    wherein the two second directional arms are provided on both sides of the first directional arm; and the lift structure further comprises a connecting rod to connect the two second directional arms, and wherein both ends of the gas spring are rotatably fixed relative to the first directional arm and the connecting rod, respectively.

2. The lift structure with adjustment assistance optimized based on ergonomics according to claim 1, further comprising a first mounting structure fixedly connected to the first directional arm and rotatably connected to one end of the gas spring.

3. The lift structure with adjustment assistance optimized based on ergonomics according to claim 2, wherein the first mounting structure is a plate structure provided on one side of the first directional arm.

4. The lift structure with adjustment assistance optimized based on ergonomics according to claim 2, further comprising a second mounting structure fixedly connected to the connecting rod and rotatably connected to the other end of the gas spring.

5. The lift structure with adjustment assistance optimized based on ergonomics according to claim 4, wherein the second mounting structure is a U-shaped structure having a notch in which the end of the gas spring is arranged.

6. The lift structure with adjustment assistance optimized based on ergonomics according to claim 5, wherein the gas spring is provided with an on/off needle valve arranged to control the expansion and contraction of the gas spring by an external force, and wherein the on/off needle valve is provided at the end of the gas spring proximal to the second mounting structure.

7. The lift structure with adjustment assistance optimized based on ergonomics according to claim 1, wherein the first directional arm and the second directional arm are rotatably connected to the top and the base respectively on one side, and are linearly slidably connected to the top and the base respectively on the other side.

8. The lift structure with adjustment assistance optimized based on ergonomics according to claim 7, wherein the side on which the first directional arm and the second directional arm are rotatably connected to the top and the base respectively is the left hand side of the user when the lift structure is in use.

9. The lift structure with adjustment assistance optimized based on ergonomics according to claim 8, wherein the gas spring is provided with an on/off needle valve arranged to control the expansion and contraction of the gas spring by an external force, and
    wherein the lift structure further comprises a switch structure arranged to apply a force on the on/off needle valve through a wire structure, wherein the switch structure is provided at the bottom of the top and located on the left hand side of the user when the lift structure is in use.

10. The lift structure with adjustment assistance optimized based on ergonomics according to claim 9, wherein the third rotating shaft is disposed on the side where the switch structure is located.

11. The lift structure with adjustment assistance optimized based on ergonomics according to claim 9, wherein the switch structure includes a seat and a handle, wherein the seat is fixedly connected to the bottom of the top and provides a support portion for rotational installation of the handle, and wherein the handle is rotatably connected to the support portion, such that the handle is rotated toward the bottom of the top under the action of the user, thereby driving one end of the wire structure to move, and is reset after the external force is released.

12. The lift structure with adjustment assistance optimized based on ergonomics according to claim 11, wherein the side of the handle facing away from the bottom of the top is curved in a direction extending from a rotational connection part toward the end directed to the user, wherein a concave side created by the curving faces the bottom of the top.

13. The lift structure with adjustment assistance optimized based on ergonomics according to claim 12, wherein the connection part between the handle and the wire structure, and the end are located on both sides of the rotational connection part.

14. The lift structure with adjustment assistance optimized based on ergonomics according to claim 7, wherein the linear sliding is carried out under the restriction of a guide rail on a guide block, and wherein the guide block is rotatably connected to the first directional arm and the second directional arm.

\* \* \* \* \*